United States Patent
Bouteiller et al.

(10) Patent No.: US 8,757,319 B2
(45) Date of Patent: Jun. 24, 2014

(54) TURBOJET ENGINE NACELLE

(71) Applicant: Aircelle, Gonfreville L'Orcher (FR)

(72) Inventors: Xavier Bouteiller, Le Havre (FR); Laurent Albert Blin, Sainte Adresse (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/713,750

(22) Filed: Dec. 13, 2012

(65) Prior Publication Data

US 2013/0112497 A1 May 9, 2013

Related U.S. Application Data

(63) Continuation of application No. PCT/FR2011/051304, filed on Jun. 9, 2011.

(30) Foreign Application Priority Data

Jun. 14, 2010 (FR) ...................................... 10 54670

(51) Int. Cl.
*F01N 1/14* (2006.01)
(52) U.S. Cl.
USPC ........... 181/220; 181/213; 181/214; 181/292; 244/1 N
(58) Field of Classification Search
CPC ........... F02K 1/386; F02K 1/827; F02K 1/38; F02K 1/40
USPC .................... 181/220, 213, 214, 292; 244/1 N
See application file for complete search history.

(56) References Cited

U.S. PATENT DOCUMENTS

| 3,572,960 | A | | 3/1971 | McBride |
| 4,749,150 | A | | 6/1988 | Rose et al. |
| 5,092,425 | A | * | 3/1992 | Shaw, Jr. ........................ 181/213 |
| 5,275,528 | A | * | 1/1994 | Freeman et al. .................. 415/1 |
| 5,721,402 | A | * | 2/1998 | Parente .......................... 181/214 |
| 5,833,433 | A | * | 11/1998 | May et al. ...................... 415/115 |
| 5,934,611 | A | * | 8/1999 | Tindell et al. ............... 244/53 B |
| 7,337,875 | B2 | * | 3/2008 | Proscia et al. ................ 181/214 |
| 7,401,682 | B2 | * | 7/2008 | Proscia et al. ................ 181/290 |
| 8,234,869 | B2 | * | 8/2012 | Tuan ............................... 60/725 |
| 2009/0140104 | A1 | | 6/2009 | Surply et al. |
| 2013/0142624 | A1 | * | 6/2013 | Julliard et al. ................ 415/119 |

FOREIGN PATENT DOCUMENTS

EP 1517022 3/2005

OTHER PUBLICATIONS

PCT/FR2011/051304 International Search Report.

* cited by examiner

*Primary Examiner* — Forrest M Phillips
(74) *Attorney, Agent, or Firm* — Brinks Gilson & Lione

(57) ABSTRACT

A turbojet engine nacelle includes at least one nacelle element having a wall delimiting a main flow channel. The flow channel has a variable flow passage section. The cross-sectional area of at least one first area of the channel is greater than that of at least one second area of the channel. The turbojet engine nacelle further includes at least one secondary flow conduit establishing a fluidic connection between the first area and the second area of the channel and is arranged parallel to the channel. The wall of the nacelle element is at least partly covered by an acoustic damping panel extending in said areas of the channel. The conduit passes through the acoustic damping panel in order to establish the secondary flow via the acoustic damping panel. The present invention can be used in the avionics field.

11 Claims, 4 Drawing Sheets

TURBOJET ENGINE NACELLE

CROSS-REFERENCE TO RELATED APPLICATIONS

This application is a continuation of International Application No. PCT/FR2011/051304 filed on Jun. 9, 2011, which claims the benefit of FR 10/54670, filed on Jun. 14, 2010. The disclosures of the above applications are incorporated herein by reference.

FIELD

The present invention relates to a turbojet engine nacelle.

BACKGROUND

The statements in this section merely provide background information related to the present disclosure and may not constitute prior art.

More particularly, it relates to a nacelle including at least one nacelle element having a wall delimiting a main flow channel, said channel having a variable flow passage section with at least one first area of the channel, the passage section of which is larger than that of at least one second area of the channel.

An airplane is driven by several turbojet engines each housed in a nacelle also harboring a set of ancillary actuation devices relating to its operation and ensuring various functions when the turbojet engine is operating or at a standstill. These ancillary actuation devices notably comprise a mechanical system for actuating thrust reversers.

With reference to FIG. 1, a nacelle N generally has a tubular structure comprising an air intake section SE1 upstream from the turbojet engine (not illustrated), a middle section SE2 intended to surround a fan S of the turbojet engine, a downstream section SE3 generally harboring thrust reversal means and intended to surround the combustion chamber of the turbojet engine, and is generally completed by an outlet section SES4, the outlet of which is located downstream from the turbojet engine.

The air intake section SE1 appears as an inlet structure element 1 of the nacelle N, located upstream from the turbojet engine and from the fan S of the turbojet engine, and this inlet structure element 1 has an internal tubular wall 10 delimiting a channel 11 for inflow of air into the nacelle N.

The middle section SE2 appears as a middle structure element 2, located upstream from the turbojet engine and surrounding the fan S, and this middle structure element 2 has an internal tubular wall 20 delimiting, with the fan S, a ring shaped air circulation channel 21.

The downstream section SE3 includes two concentric downstream structure elements 30, 31 located downstream from the fan S and surrounding the turbojet engine, i.e., a downstream external structure element 30, a so called Outer Fixed Structure (OFS), and a downstream internal structure element 31, a so called Inner Fixed Structure (IFS).

This downstream external structure element 30 has an internal tubular wall 32 and this downstream internal structure element 31 has an external ring shaped wall 33, wherein these tubular walls 32 and 33 delimit between them a ring shaped flow channel 34, also called a vein, intended for channelling the cold air flow circulating on the outside of the turbojet engine.

When operating, the turbojet engine of the dual flow type generates via the rotating blades of the fan S, a hot air flow (also called primary flow) from the combustion chamber of the turbojet engine, and a cold air flow (secondary flow) which circulates on the outside of the turbojet engine in the ring shaped flow channel 34.

The outlet section SE4 includes at least one gas ejection nozzle element 4, located downstream from the turbojet engine, wherein this nozzle element 4 includes at least one ring shaped wall 40 delimiting an air outflow channel 41 out of a nacelle N. In this way, the primary and secondary flows are ejected from the engine from the rear of the nacelle N, via said or these outlet channels 41.

In a nacelle said to be with separate flows, the primary and secondary flows are not mixed, i.e. they are separated at the outlet and circulate in primary and secondary nozzle elements respectively. In a so called nacelle with mixed flows, the primary and secondary flows are mixed downstream from the engine within a common nozzle element.

In order to limit sound pollution of airplanes and as illustrated in FIG. 1, it is conventional to at least partly cover the walls of the different nacelle elements with acoustic damping panels 5.

FIG. 2 illustrates an exemplary acoustic damping panel 5, of the sandwich composite panel type, including:

- a structuring skin 50, of the so called "solid" air-proof skin type, attached against the wall of the relevant nacelle element;
- a perforated skin 51, of the so called "acoustic" air-proof skin type at least partly delimiting the flow channel in this nacelle element;
- a core 52 inserted between the structuring skin 50 and the perforated skin 51, said core 52 being made in an acoustic absorption material of the type having numerous internal cavities.

Such panels form acoustic resonators capable of "trapping" the noise and therefore attenuating sound emissions towards the outside of the nacelle.

In the embodiment illustrated in FIG. 2, the core 52 is made in a cellular structure material of the honeycomb type. This material includes a plurality of honeycomb cells delimited by side walls, each honeycomb cell communicating with its neighbors. Such panels with a honeycomb structure are already known, notably from international applications WO 2008/113904 and WO 2009/066036, and will not be described in further details.

In an embodiment not shown, notably described in French patent applications FR 2 938 014 and FR 2 934 641, the core is made in a porous material; by "porous material" is meant an open material (i.e. having many communicating cavities) appearing as a foam or in an expanded form, or as a felt, or as an aggregate of small-size elements such as beads.

According to the architecture of the nacelle, certain of the aforementioned channels have a variable flow passage section with at least one first area of the channel, the passage section of which is greater than that of at least one second area of the channel. Given that the distribution of the pressure in a channel depends on the flow passage section, these channels have high pressure areas (associated with large passage sections) and low pressure areas (associated with small passage sections).

FIG. 3 illustrates the change in the flow passage section A (in m2) in the inlet channel 11 versus the longitudinal position X (in cm) along the middle axis AA' of the nacelle N. At least two distinct areas Z1, Z2 are distinguished, i.e.:

a first small section area Z1 close to the air intake neck C, corresponding to an operating low pressure and high speed area on the airplane; and a second large section area Z2, close to the fan, corresponding to an operating high pressure and low speed area on the airplane.

FIG. 4 illustrates on the curves C1 to C3, several examples of the change in the section A, based on the section Acol taken at the neck C, for letting through the flow into a ring shaped channel versus the longitudinal position X (in m) along the middle axis AA' of the nacelle N. The curves Rint and Rext illustrate the change in the internal and external radii of the relevant ring shaped channel versus the longitudinal position X. At least two distinct areas Z1, Z2 are distinguished, i.e.:

a first small section area Z1, corresponding to an operating low pressure and high speed area on the airplane; and a second large section area Z2 corresponding to an operating high pressure and low speed area on the airplane.

This ring shaped channel may be located in the downstream section SE3 or the outlet section SE4 of a nacelle N. For example, this ring shaped channel may correspond to the ring shaped channel 34, or vein, located between the downstream external structure element 30 (Outer Fixed Structure) and the downstream internal structure element 31 (Inner Fixed Structure). This ring shaped channel may also be located in a nozzle element, such as for example in a primary or secondary nozzle element for a nacelle with separate flows, or in a common nozzle element for a nacelle with mixed flows.

However, on the walls delimiting the different channels of the nacelle, the turbulent limiting layers of the flow generate pressure losses by friction. The impact of these pressure losses on the performance of the turbojet engine and therefore on the fuel consumption is significant. The applicants also noticed a loss of about 1.5% of the fuel consumption because of these frictional processes in the secondary nozzle element of a nacelle with separate flows.

The state of the art may also be illustrated by the teachings of patent applications US 2009/140104 A1, EP 1 517 022 A2 and U.S. Pat. No. 3,572,960 A.

The patent application US 2009/140104 A1 discloses a nacelle including blowing means intended to inject a tangential airflow into the internal volume of the nacelle, wherein these blowing means include at least one air inflow conduit capable of sampling the tangential air flow at the compressors of the turbojet engine, so as to guide the air flow in the nacelle, so as to be maintained parallel to the longitudinal axis of the nacelle and to suppress possible separations of air streams in the nacelle.

Patent application EP 1 517 022 A2 discloses a method for attenuating the turbojet engine noise consisting of increasing the flow velocity locally, reducing the limiting layer and the associated turbulences and optimizing refraction and absorption of sounds with an acoustic cover, wherein the increase in this velocity may be provided by means of a bypass conduit which sucks up and blows air into the nacelle by a difference in pressure.

Patent application U.S. Pat. No. 3,572,960 A discloses the placement of one or several conduits inside a fan cowl, between outlet rectifying fins and inlet directing fins positioned in the main flow channel, in order to at least substantially remove the wakes at the trailing edges of the inlet directing fins, and therefore reduce the noise.

SUMMARY

The object of the present invention is to solve at least partly the aforementioned drawbacks by proposing a nacelle in which the frictional pressure losses on the walls delimiting the channels of the nacelle are reduced.

For this purpose, it proposes a turbojet engine nacelle including at least one nacelle element having a wall delimiting a main flow channel, said channel having a variable flow passage section with at least one first area of the channel, the passage section of which is greater than that of at least one second area of the channel, said nacelle further including at least one secondary flow conduit establishing a fluidic connection between the first area and the second area of the channel in parallel on said channel, remarkable in that the wall of the nacelle element is at least partly covered by an acoustic damping panel extending in the first and second areas of the channel, said panel including:

a structuring skin attached against said wall of the nacelle element;

a perforated skin at least partly delimiting the channel;

a core inserted between the structuring skin and the perforated skin, said core being made in an acoustic absorption material of the type having many internal cavities;

and wherein said or each conduit has a first end crossing the structuring skin in the first area of the channel on the one hand and a second end crossing the structuring skin in the second area of the channel on the other hand, in order to establish the secondary flow in the conduit via the core and the perforated skin of the acoustic damping panel.

When operating on the airplane, the pressure difference between the first area (high pressure) and the second area (low pressure) allows generation of a secondary flow between both of these areas. Thus, with this (these) conduit(s) a secondary flow is obtained from the first area to the second area with:

suction in a first area, in other words in the high pressure area(s); and blowing in the second area, in other words in the low pressure area(s).

More specifically, a secondary flow is obtained from the first area to the second area with:

suction in the first area, through holes made in the perforated skin and through the core; and blowing in the second area, also through holes made in the perforated skin and through the core.

The blowing in the second area advantageously allows reduction in the friction coefficient of the limiting layer in this second area, thereby reducing the pressure losses by friction.

With this (these) conduit(s), the air sampled from the channel of the nacelle is re-injected into the same channel of the nacelle, so that this secondary flow does not form a leak. This (these) conduit(s) thereby form a passive suction and blowing system, without any external source of flow.

Further, the flow rate of air circulating in the conduit(s) (in other words in the secondary flow) may also improve the cooling of the structure of the nacelle in the case when the air sampled in the first area(s) is cold.

In an advantageous embodiment, the conduit(s) define(s) in the first area of the channel an inlet surface for the secondary flow on the one hand and in the second area of the channel an outlet surface for the secondary flow, wherein the inlet surface has a surface area greater than that of the outlet surface.

Indeed, suction in the first area will on the other hand increase the friction coefficient of the limiting layer in this first area, thereby increasing the pressure losses by friction. Thus, with the invention it is possible to reduce the pressure losses by friction in the second area(s) and to increase the pressure losses by friction in the first area(s).

In order to globally reduce the pressure losses by friction, in other words over the whole of the areas of the channel, and thereby improve the performance of the turbojet engine and reduce fuel consumption, it is advantageous to have the following conditions:

the suction rate in the first area(s) has to be as low as possible so as to limit the increase in the friction coefficient in these first suction areas; and the blowing rate in the second area(s) should be as high as possible so as to reduce as much as possible the friction coefficient in these second blowing areas, which are also areas with high flow rates in the channel and therefore with high drag.

To do this, it is advantageous to have a larger suction surface area than the blowing surface area, in other words, the secondary flow inlet surface has a larger surface area than the surface area of the secondary flow outlet surface.

Advantageously, the ratio between the surface area of the inlet surface and the surface area of the outlet surface is greater than 2, and preferably of the order of 4. A ratio of 4, in other words, a ratio of about 80%/20% between these surface areas, is particularly suitable for the nacelles.

According to one feature, the core of the acoustic damping panel has at least one internal wall positioned between the first end and the second end of the conduit(s) in order to establish the seal of the core between the first area and the second area of the channel, thereby advantageously ensuring a secondary flow in the conduit(s), and not over the length of the core.

According to another feature, the acoustic absorption material of the core of the acoustic damping panel is of the cellular notably honeycomb structure type material, or a porous material.

Said or each nacelle element may be selected from the following elements:

an inlet structure element of the nacelle, located upstream from the turbojet engine and from a fan of the turbojet engine, said inlet structure element having an internal tubular wall delimiting an air inflow channel into the nacelle;

a middle structure element, located upstream from the turbojet engine and surrounding the fan, said middle structure element having an internal tubular wall delimiting, with the fan, a ring shaped channel for circulation of the air;

a downstream external structure element, located downstream from the fan and surrounding the turbojet engine, said downstream external structure element having an internal tubular wall delimiting, with a downstream internal structure element, a ring shaped flow channel intended to channel the cold air flow circulating on the outside of the turbojet engine;

a downstream internal structure element, located downstream from the fan and surrounding the turbojet engine, said internal structure element having an external ring shaped wall delimiting, with the downstream external structure element, a ring shaped flow channel intended to channel the cold air flow circulating on the outside of the turbojet engine;

an ejection nozzle element located downstream from the turbojet engine;

said nozzle element including at least one ring shaped wall delimiting an air outflow channel out of the nacelle.

It is thus possible to have such conduits in several structural elements of the nacelle, just as it is possible to provide one or a plurality of conduits for a same channel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
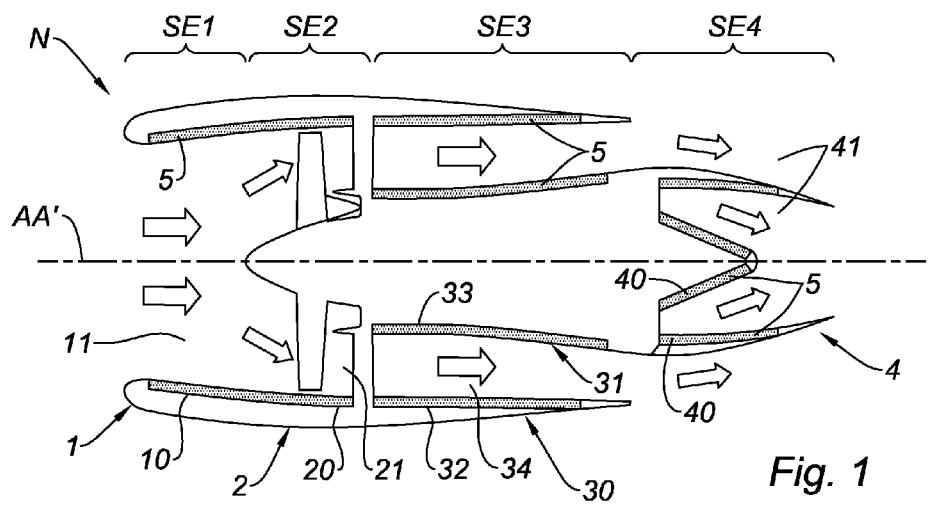
FIG. 1 is a schematic longitudinal sectional view of a nacelle of a known type.
Figure 2:
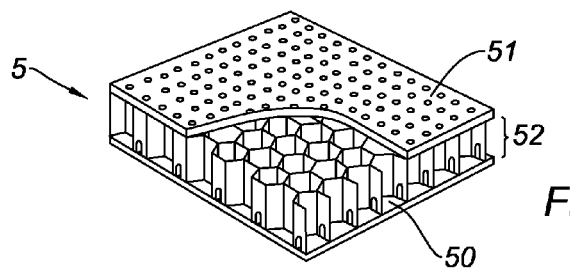
FIG. 2 is a schematic perspective view of a known acoustic damping panel with a cellular structure for a nacelle, with partial cutaway of one of its skins.
Figure 3:
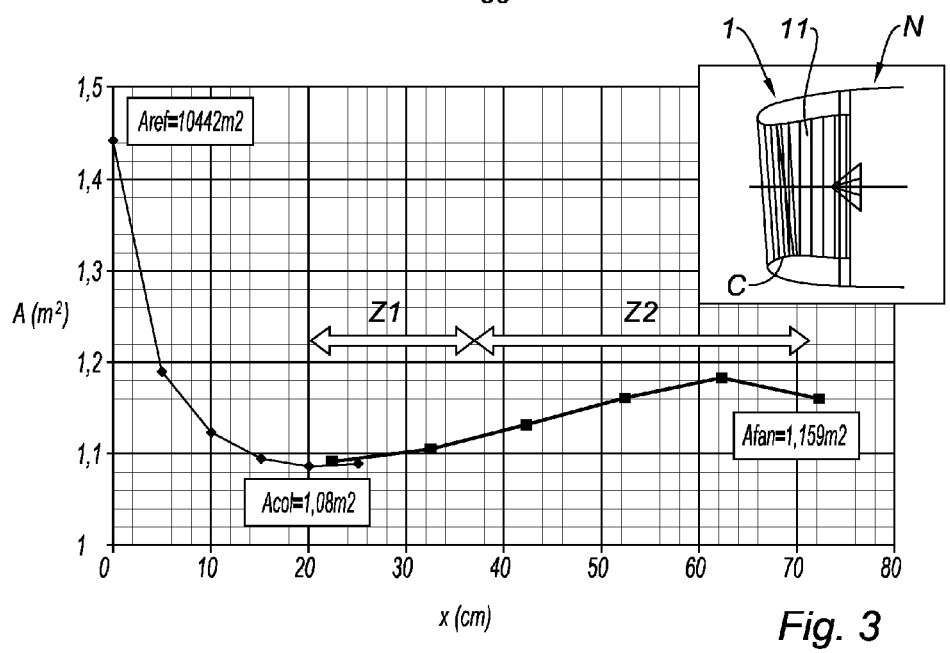
FIG. 3 is a graph illustrating the change in the flow passage section A in a nacelle intake channel versus the longitudinal position X, with a schematic illustration on the upper right of this nacelle intake channel.
Figure 4:
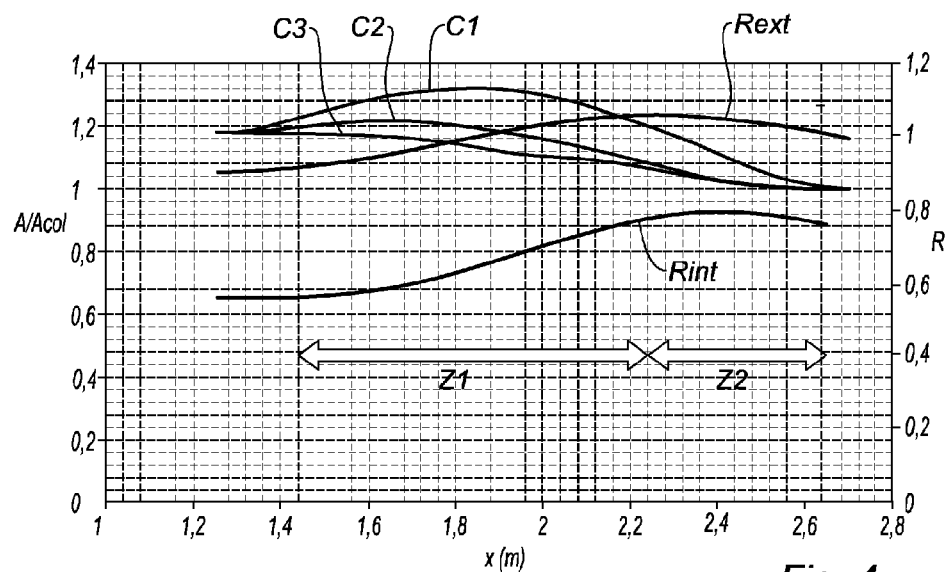
FIG. 4 is a graph illustrating several curves of the change in the section A, based on a section Acol taken at the neck C of a ring shaped channel (or vein) of a nacelle, of the passage of flow in this ring shaped channel of the nacelle versus the longitudinal position X, as well as the change in the internal and external radii of this ring shaped channel versus the longitudinal position X.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A nacelle according to the invention is described with reference to FIGS. 5 to 7. This nacelle includes at least one nacelle element having a wall delimiting a main flow channel, wherein this channel has a variable flow passage section with at least one first area Z1 of the channel, the passage section of which is larger than that of at least one second area Z2 of the channel.

These nacelle elements have already been described above, i.e. the inlet structure element 1, the middle structure element 2, the downstream external structure element 30, the downstream internal structure element 31 and the nozzle element(s) 4, as for example the primary and secondary nozzle elements for a nacelle with separate flows and the common nozzle element for a nacelle with mixed flows.

Figure 5:
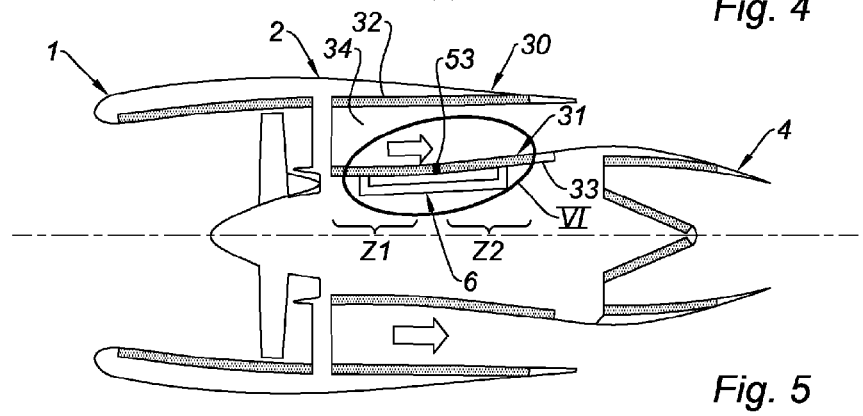
FIG. 5 is a schematic longitudinal sectional view of a nacelle according to the invention.

For the further description, and as illustrated in FIG. 5, the downstream internal structure element 31, a so called Inner Fixed Structure (IFS) is selected which has a wall, an external tubular wall 33 delimiting with the internal ring shaped wall 32 of the downstream external structure element 30, the ring shaped flow channel 34. Of course, the other elements 1, 2, 30 and 4 might have been selected for describing and illustrating the invention.

This ring shaped channel 34 has two areas Z1, Z2 with distinct sections, i.e., a first small section area Z1, corresponding to an operating low pressure and high speed area on the airplane, and a second large section area Z2 corresponding to an operating high pressure and low speed area on the airplane.

According to the invention, this nacelle further includes at least one secondary flow conduit 6 establishing a fluidic connection between the first area Z1 and the second area Z2 of the channel 34 in parallel on this channel 34. According to the invention, the nacelle may include a plurality of secondary flow conduits 6 establishing a fluidic connection between the first area Z1 and the second area Z2 of the channel 34 in parallel on this channel 34.

An acoustic damping panel 5 is mounted on the external tubular wall 33; this acoustic damping panel 5 being of the type already described above with a structuring skin 50, a perforated skin 51 and a core 52 made in an acoustic absorption material having many internal cavities.

Figure 6:
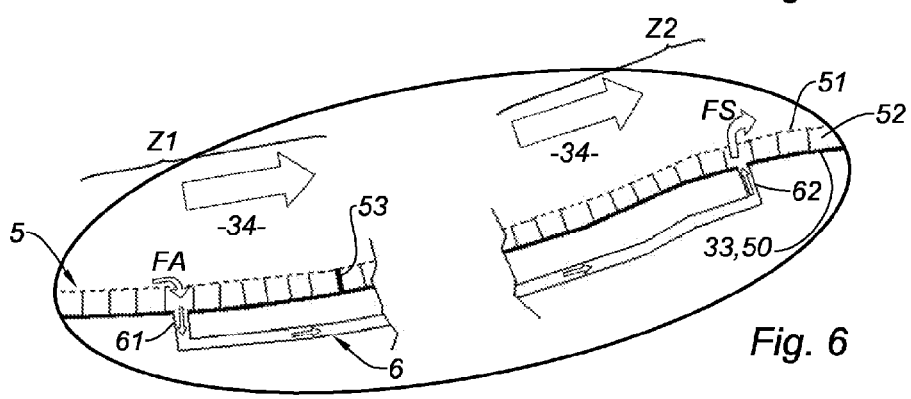
FIG. 6 is an enlarged view of the area VI of FIG. 5.

As visible in FIG. 6, said or each conduit 6 has two opposite ends, i.e., a first end 61 crossing the structuring skin 50 in the first area Z1 of the channel 34, and a second end 62 crossing the structuring skin 50 in the second area Z2 of the channel 34.

Further, the core 52 of the acoustic damping panel 5 has at least one internal wall 53 (schematized in FIG. 5) positioned between the first end and the second end of the conduit(s) in order to establish the seal of the core between the first area and the second area of the channel.

As schematized by the arrows in FIG. 6, the secondary flow is established in the conduit 6, from the first end 61 to the second end 62, via the core 52 and the holes of the perforated skin 51 of the acoustic damping panel 5, with:
- suction in the first area Z1, through the holes made in the perforated skin 51, the core 52 and the first end 61 of the conduit 6; and
- blowing in the second area Z2, through the second end 62 of the conduit 6, through the holes made in the perforated skin 51 and the core 52.

Figure 8:
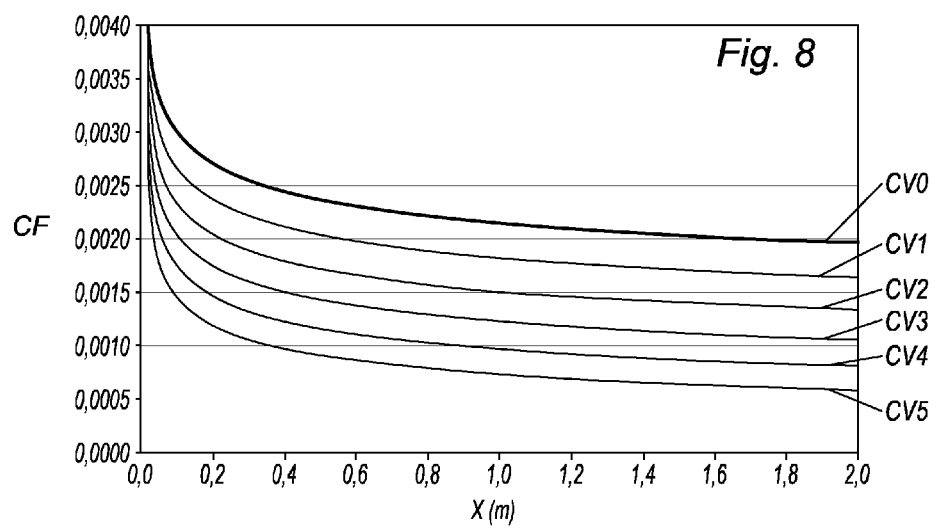
FIG. 8 is a graph illustrating several curves versus the suction rate through a conduit in a second area of a channel of a nacelle according to the invention, these curves illustrating the change in the friction coefficient Cf in this second area versus the longitudinal position X.

FIG. 8 is a graph illustrating several curves CV0 to CV5 illustrating the change in the friction coefficient Cf versus the longitudinal position X, the friction coefficient Cf being considered at a wall delimiting a main flow channel, in a second area (or blowing area) of this channel. The curves CV0 to CV5 are functions of the blowing rate VS through a conduit in this second are of the channel, with:
- CV0: curve showing the change in CF for VS=0 m/s;
- CV1: curve showing the change in CF for VS=0.1 m/s;
- CV2: curve showing the change in CF for VS=0.2 m/s;
- CV3: curve showing the change in CF for VS=0.3 m/s;
- CV4: curve showing the change in CF for VS=0.4 m/s; and
- CV5: curve showing the change in CF for VS=0.5 m/s.

The reduction in the friction coefficient CF with the blowing rate VS is noted in this FIG. 8. In other words, the greater the blowing rate VS and the lower is the friction coefficient CF. Thus, the friction coefficient CF is reduced by about 50% for a blowing rate of 0.3 m/s (curve CV3) as compared with a zero blowing rate (curve CV0).

Figure 9:
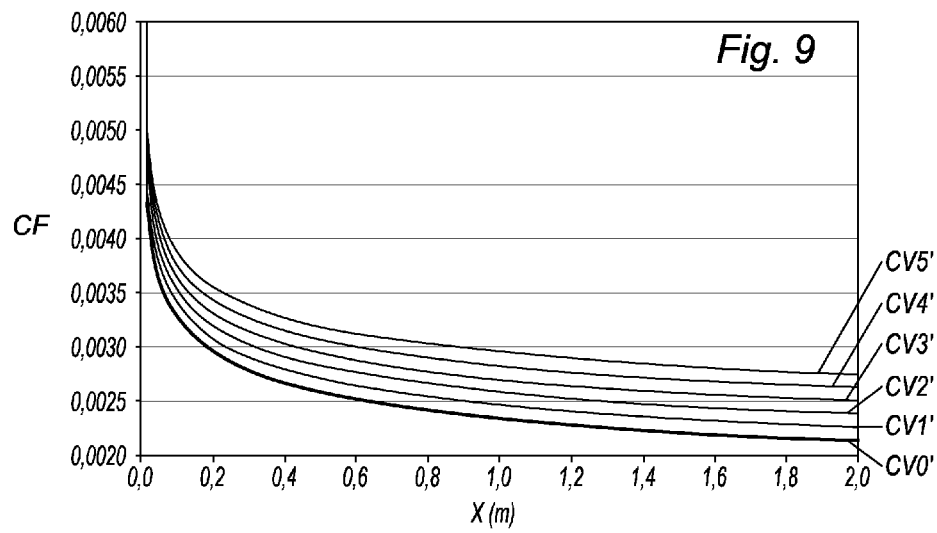
FIG. 9 is a graph illustrating several curves versus the blowing rate through a conduit in a first area of a channel of a nacelle according to the invention, these curves illustrating the change in the friction coefficient Cf in this first area versus the longitudinal position X.
Figure 10:
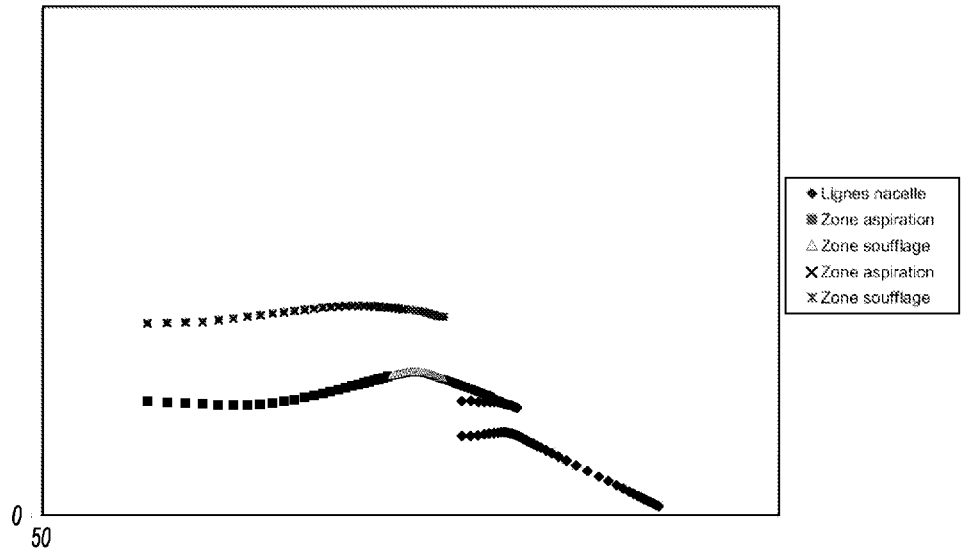
FIG. 10 is a graph illustrating the change in the radius of the various internal/external walls of the primary/secondary channels versus the longitudinal position X.

FIG. 9 is a graph illustrating several curves CV0' to CV5' illustrating the change in the friction coefficient CF versus the longitudinal position X, the friction coefficient CF being considered at a wall delimiting a main flow channel, in a first area (or suction area) of this channel. The curves CV0' to CV5' are functions of the suction rate VA through a conduit in this first area of the channel with:
- CV0': curve showing the change in CF for VA=0 m/s;
- CV1': curve showing the change in CF for VA=0.02 m/s;
- CV2': curve showing the change in CF for VA=0.04 m/s;
- CV3': curve showing the change in CF for VA=0.06 m/s;
- CV4': curve showing the change in CF for VA=0.08 m/s; and
- CV5': curve showing the change in CF for VA=0.10 m/s.

The increase in the friction coefficient CF with the suction rate VA is noted in this FIG. 9. In other words, the greater the suction rate VA and the greater is the friction coefficient CF. Thus, the friction coefficient CF is increased by about 15% for a suction rate of 0.06 m/s (curve CV3') as compared with a zero suction rate (curve CV0').

Figure 7:
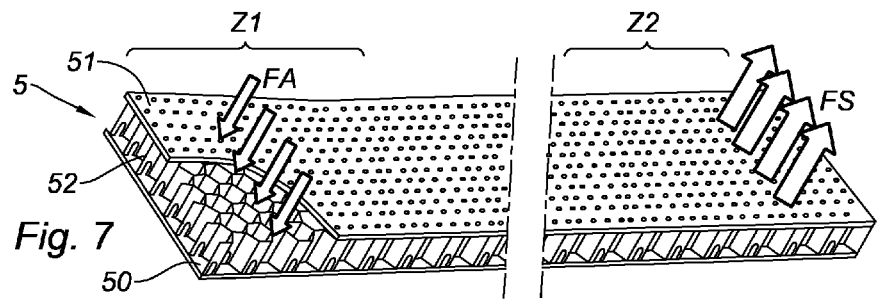
FIG. 7 is a schematic perspective view of a known acoustic dampening panel with a cellular structure for a nacelle according to the invention, illustrating the suction and the blowing in the first and second areas of a channel.

In order to globally reduce the pressure losses by friction, in other words over the whole of the area Z1, Z2 of the channel 34, and thereby improve the performance of the turbojet engine and reduce fuel consumption, the suction surface area is larger than the blowing surface area, so that the suction rate VA in the first area Z1 is lower than the blowing rate VS in the second area Z2, as schematized in FIGS. 6 and 7 with the arrows FA which symbolize the suction in the first area Z1 and the arrows FS which symbolize the blowing in the second area Z2.

In other words, the inlet surface of the secondary flow (or suction surface) has a surface area larger than the surface area of the outlet surface of the secondary flow (blowing surface).

In order to have a good compromise between suction and blowing, the ratio between the surface area of the inlet surface (or suction surface) and the surface area of the outlet surface (blowing surface) is of about 80%/20% i.e. of the order of 4.

Figure 11:
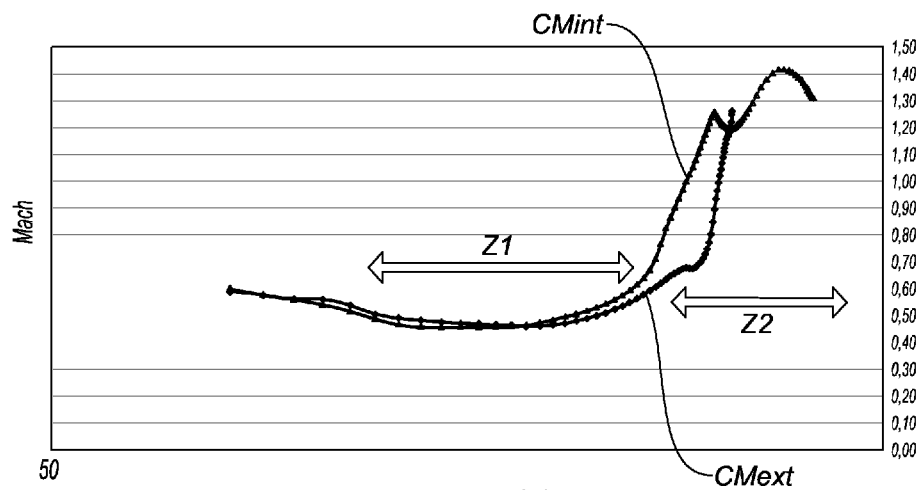
FIG. 11 is a graph illustrating the change in the Mach number versus the longitudinal position X for an inner wall and an outer wall of a ring shaped channel equipped with a conduit according to the invention.

FIG. 11 is a graph illustrating the change in the Mach value (or Mach number) versus the longitudinal position X for an inner wall (curve CMint) and an outer wall (curve MMExt) of a ring shaped channel in order to illustrate the localization of the first suction area Z1 and of the second blowing area Z2.

With the invention, a specific consumption gain of about 0.2% is estimated; this 0.2% gain being calculated from the overall reduction in the friction coefficient which allows determination of the gain in pressure loss in the ring shaped channel. Next, an exchange coefficient allows calculation of the equivalent in terms of specific consumption gain.

Of course, the exemplary application mentioned above does not have any limiting nature and other detailed and improvements may be provided to the nacelle according to the invention, without however departing from the scope of the invention wherein other localizations of the conduit(s) and/or other forms of acoustic damping walls may be made for example.

What is claimed is:

1. A turbojet engine nacelle including at least one nacelle element having a wall delimiting a main flow channel, said channel having a variable flow passage section with at least one first area of the channel, the passage section of which is greater than that of at least one second area of the channel, wherein the wall of the nacelle element is at least partly covered by an acoustic damping panel extending in the first and the second area of the channel, said panel including:

a structuring skin attached against said wall of the nacelle element;

a perforated skin at least partly delimiting the channel; and a core inserted between the structuring skin and the perforated skin, said core being made in an acoustic absorption material of the type having many internal cavities, wherein said nacelle further including at least one secondary flow conduit establishing a fluidic connection between the first area and the second area of the channel in parallel on said channel, wherein said or each conduit has a first end crossing the structuring skin in the first area of the channel on the one hand and a second end crossing the structuring skin in the second area of the channel on the other hand, in order to establish the secondary flow in the conduit via the core and the perforated skin of the acoustic damping panel.

2. The nacelle according to claim 1, wherein said conduit(s) define in the first area of the channel an inlet surface for the secondary flow on the one hand and in the second area of the channel an outlet surface for the secondary flow, on the other hand, wherein the inlet surface has a larger surface area than that of the outlet surface.

3. The nacelle according to claim 2, wherein the ratio between the surface area of the inlet surface and the surface area of the outlet surface is greater than 2.

4. The nacelle according to claim 1, wherein the core of the acoustic damping panel has at least one internal wall positioned between the first end and the second end of the conduit(s) in order to establish the seal of the core between the first area and the second area of the channel.

5. The nacelle according to claim 1, wherein the acoustic absorption material of the core of the acoustic damping panels of the cellular notably honeycomb structure type material, or a porous material.

6. The nacelle according to claim 1, wherein said or each nacelle element is an inlet structure element of the nacelle, located upstream from the turbojet engine and from a fan of the turbojet engine, said inlet structure element having an internal tubular wall delimiting an air intake channel in the nacelle.

7. The nacelle according to claim 1, wherein said or each nacelle element is a middle structure element, located upstream from the turbojet engine and surrounding the fan, said middle structure element having an internal tubular wall delimiting, with the fan a ring shaped channel for circulation of air.

8. The nacelle according to claim 1, wherein said or each nacelle element is a downstream external structure element, located downstream from the fan and surrounding the turbojet engine, said downstream external structure element having an internal tubular wall delimiting, with a downstream internal structure element, a ring shaped flow channel intended to channel the cold air flow circulating on the outside of the turbojet engine.

9. The nacelle according to claim 1, wherein said or each nacelle element is a downstream internal structure element, located downstream from the fan and surrounding the turbojet engine, said downstream internal structure element having an external ring shaped wall delimiting with the downstream external structure element, a ring shaped flow channel intended to channel the cold air flow circulating on the outside of the turbojet engine.

10. The nacelle according to claim 1, wherein said or each nacelle element is an ejection nozzle element located downstream from the turbojet engine, said nozzle element including at least one ring shaped wall delimiting an air outflow channel out of the nacelle.

11. The nacelle according to claim 2, wherein the ratio between the surface area of the inlet surface and the surface area of the outlet surface is on the order of 4.

\* \* \* \* \*